United States Patent [19]

Blanco et al.

[11] Patent Number: 4,693,551

[45] Date of Patent: Sep. 15, 1987

[54] DIELECTRIC STRENGTH ELEMENTS FOR LOOSE TUBE OPTICAL FIBER CABLE

[75] Inventors: Carlos Blanco, Roanoke; Adolf R. Asam, Botetourt; John C. Smith, Roanoke, all of Va.

[73] Assignee: U.S. Holding Company, Inc., New York, N.Y.

[21] Appl. No.: 539,344

[22] Filed: Oct. 5, 1983

[51] Int. Cl.⁴ .............................. G02B 6/44
[52] U.S. Cl. ........................ 350/96.23; 350/96.10
[58] Field of Search ........................ 350/96.23

[56] References Cited

U.S. PATENT DOCUMENTS

| | | | |
|---|---|---|---|
| 4,113,349 | 9/1978 | Stiles | 350/96.23 |
| 4,272,155 | 6/1981 | Slaughter | 350/96.23 |
| 4,330,173 | 5/1982 | Oestreich | 350/96.23 |
| 4,529,265 | 7/1985 | Toya et al. | 350/96.21 |

FOREIGN PATENT DOCUMENTS

| | | | |
|---|---|---|---|
| 2648996 | 5/1977 | Fed. Rep. of Germany | 350/96.23 |
| 2497964 | 7/1982 | France | 350/96.23 |
| 0010739 | 1/1977 | Japan | 350/96.23 |
| 0007248 | 1/1978 | Japan | 350/96.23 |
| 2065324 | 6/1981 | United Kingdom | 350/96.23 |
| 2073440 | 10/1981 | United Kingdom | 350/96.23 |

OTHER PUBLICATIONS

"48 Core Optical Fiber Cable Design and Characteristics" by Ishihara, Review of the E. Communication Lab., vol. 27, #11-12, Nov.-Dec. 1979.

"Composite Fiber Optic Overhead Ground Wire" by Igarashi, International Wire & Cable Symposium Proceedings, Nov. 1980.

"Design, Manufacture, Performance and Installation of a Ruggedized Fibernet O. Cable by Scadding", Inter. Wire & Cable Symposium, Nov. 1980.

"Metal Free, Fully O. Cable for Telecommunication" by Portinari, Inter. Wire & Cable, 161-73, Nov. 1980. Siecor Optical Cables, Inc., C612/622/012/022 (6/79 MA).

Primary Examiner—William L. Sikes
Assistant Examiner—Akm E. Ullah
Attorney, Agent, or Firm—Spencer & Frank

[57] ABSTRACT

An optical fiber cable employs a central strength member fabricated from a dielectric material which member is surrounded by a plurality of peripheral tubes each having a hollow loosely containing an optical fiber. The tubes are fabricated from a plastic having embedded therein glass fibers to offer additional strength to the tubes to thereby permit a substantial reduction in the cross-section of the central support member which now serves in conjunction with the tubes to provide strength to the overall cable.

17 Claims, 2 Drawing Figures

DIELECTRIC STRENGTH ELEMENTS FOR LOOSE TUBE OPTICAL FIBER CABLE

BACKGROUND OF INVENTION

The present invention relates to fiber cables and more particularly to an improved fiber cable employing loose tubes for carrying the fibers.

Optical fiber transmissions have the advantage, among many other ones of their immunity to electrical interferences as the information being transmitted is in the form of light pulses. As an optical fiber is composed entirely of dielectric materials it is not affected by electric signals or rust effects as most of the conductor metallic materials are.

Optical fibers are packed together and protected by a jacket to form an optical cable. Depending on the type of application, the requirements on the cable construction can be different. In some cases no special dielectric or noncorrosive requirements must be fulfilled, and the cable can include metallic components such as strength members or moisture resistant barriers. In other applications, however, some specific requirements can be needed and thus, an all dielectric cable will be necessary to be designed. An all dielectric cable does not attract lightning.

An essential component of the optical cables is the strength member which supports most of the tension that is necessary to apply to the cable during the installation work or during the cable operation.

Very few materials have been found, among the dielectric ones, with enough tensile strength and low elongation as to qualify them as strength members to be used in optical cables. For this reason, the price of these few products is very high.

On the other hand, when the size and weight of the cable are relatively large, the diameter of the strength member required is so large that the flexibility of the final cable is seriously impaired.

These advantages have been found particularly crucial when designing fully dielectric loose tube cables, as will be further explained.

The prior art was cognizant of certain of these problems and there are many patents and articles directed towards the protection and use of fibers in cable structures. See U.S. Pat. No. 4,038,489 issued on July 26, 1977 to D. W. Stenson, et al. and entitled CABLES. This patent shows a cable for dielectric optical waveguides or fibers, the fibers are arranged in segmented compartments. Tensile members are provided in the core of the cable and/or externally of the segmented compartments. Other patents such as U.S. Pat. No. 3,865,466 entitled OPTICAL GUIDES issued on Feb. 11, 1975 to R. J. Slaughter and depict a cable having an elongated central core consisting of at least one non-optical reinforcing member, a plurality of optical bundles arranged together in at least one stranded layer about the core and surrounding the stranded body there is an outer protective sheath. Still other patents such as U.S. Pat. Nos. 4,072,398 and 4,199,244 depict various cable formats for protecting the optical fibers while employed in a cable construction.

In any event, in constructing a cable employing fiber optics there is a desire to provide the cable with proper supporting structures and to completely eliminate any metal or electrically conducting components. In this way the cable is completely dielectric. Thus a growing number of users of fiber optic cables want to retain the dielectric characteristics of the optical fibers and avoid the use of metallic members such as steel strength members.

Hence many cable manufacturers fabricate such cables using Kevlar, Epoxy or Polyester impregnated Kevlar rods and Epoxy or Polyester impregnated "S" or "E" glass rods. These materials are relatively expensive and difficult to obtain.

It is of course a major factor in the production of such cables to keep the cost down while not departing from the electrical and mechanical properties of the product. Thus if one can reduce the cost of the dielectric strength members, one can achieve a lower cost for the optical cable.

It is therefore an object of the present invention to provide an optical fiber cable capable of being produced at a lower cost while maintaining proper strength and operating characteristics.

DESCRIPTION OF THE PREFERRED EMBODIMENT

In a dielectric loose tube optical fiber cable having a tubular outer covering and containing a central strength member of a dielectric material, with a plurality of peripheral hollow fiber containing tubes surrounding said central member and positioned between said central member and said outer covering, the improvement therewith comprising said hollow fiber containing tubes fabricated from a plastic having embedded therein a plurality of glass fibers substantially oriented in the longitudinal direction along said tube, whereby said tubes contribute to the strength of said cable allowing a reduction in the cross sectional area of said central strength member.

DETAILED DESCRIPTION OF THE INVENTION

The above explanation is particularly applicable when designing loose tube cables for optical fibers.

Figure 1:
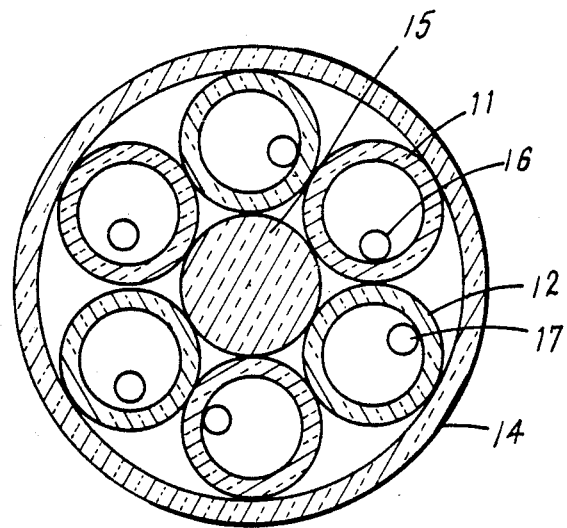
FIG. 1 is a cross-sectional view of a loose tube fiber cable according to this invention.

Referring to FIG. 1, a loose tube cable is shown. In this cable a plurality of tubes as 11, 12, are emplaced within a hollow longitudinal cable sheath or jacket 14 and abut against a central strength or supporting member 15. Each tube as 11 and 12 houses an optical fiber 16, and 17 within the hollow of the same. In the present state of the art the central strength member 15 is an epoxy impregnated glass member and used to preserve the dielectric character of the cable. The outer tubes as 11 and 12 are normally fabricated from a plastic material. The epoxy impregnated glass is expensive and substantially increases the cost of the cable. As indicated above when the presence of a metal is not objectionable the central member 15 was fabricated from a stainless steel or other metal which of course, is not suitable for full dielectric cables. Hence the strength member 15 in dielectric cables was fabricated from epoxy-impregnated glass fiber structures or from aramid fibers such as those sold under the trademark Kevlar. These materials are also expensive and difficult to obtain. The fiber containing tubes as 11 and 12 are normally plastic tubes as the entire support and strength for the cable was designed to be accomodated by the strength member 15.

In fiber optic cable designs, it is a common practice to ascribe the whole tension required to the strength member 15 and to dimension this component disregarding the contribution to the strength of the rest of the elements of the cable. The remaining elements are only taken into consideration as contributors to the total cable weight.

The basic concept which embodies this invention is two fold.

Primarily it is assumed that other cable components such as tubes 11 and 12, apart from the strength member 15 can also cooperate to provide the required cable tension.

Secondly, those tubes as 11, 12 are made of a material with a higher tensile modulus and comparatively equal flexural modulus than the material they replace.

The contribution to the tensile strength of a material is a function of the product of the cross area and the modulus of that material.

In order to take full advantage of the above, a material of relatively large cross section must be selected. In the loose tube cable, the largest cross sectional area corresponds to the coating of the strength member and consequently it has been chosen as the element intended to contribute to the cable tension. The loose tubes 11, 12 themselves can also be considered as elements than can contribute to the cable design.

These tubes 11 and 12 as will be explained are fabricated from a material selected to have a tensile modulus ten times larger than the high density polyethylene of which such tubes were formerly made from. This material will be called reinforced plastic.

The tubes 11 and 12 are fabricated from a polymer in which there are embedded short lengths of glass fiber (about ½ centimeter). The volume percentage of glass fiber in each tube is up to 30% preferably between 25 to 30%.

Figure 2:
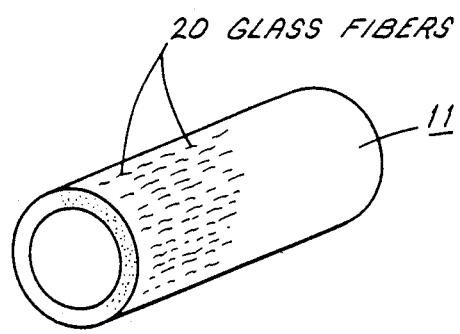
FIG. 2 is a sectional view of a supporting tube depicting the embedded glass fibers.

The tubes 11 and 12 are extruded with the glass fibers and as the extrusion process continues the short glass fibers interspered in the plastic material in a random orientation became reoriented so as to extend substantially in the longitudinal direction of the loose tube element. Referring to FIG. 2, there is shown a pictorial representation of a tube as 11 with the glass fibers as 20 aligned in the longitudinal direction. In practice the extrusion process pushes the fibers into the plastic material so that they are not exposed at the surface of the tube.

The basic strength member remains to be the S-glass made of glass fibers impregnated in an epoxy resin.

The new cable is designed taking into account the added weight provided by the reinforced plastic (nearly two times heavier than the polyethylene) and the composite strength of both the S-glass and the reinforced profile.

The new cable only requires an S-glass strength member 15 that has a diameter 3.8 times smaller than that required by a prior art cable of the same characteristics.

In consequence, the new cable overcomes the problems that were mentioned above.

The cost of the cable will be lowered as it uses significantly less quantity of the proportionately most expensive component. The flexibility of the whole cable will also be improved as the diameter of the S-glass has been dramatically reduced.

Thus the new cable construction offers a significant reduction in the size of the central supporting member 15 resulting in cost reduction of the cable without impairment of the cable strength. The central supporting member which is now of a smaller diameter could be as indicated fabricated from an epoxy impregnated "S" glass or a glass reinforced plastic. The tubes as 11 and 12 which loosely hold the optical fibers are fabricated from an extruded polyethylene plastic having embedded therein glass fibers to enable the tubes to provide additional cable support as described above.

We claim:

1. In a dielectric loose tube optical fiber cable having a tubular outer covering and containing a central strength member of a dielectric material, with a plurality of peripheral hollow fiber containing tubes surrounding said central member and positioned between said central member and said outer covering the improvement therewith comprising:

each of said plurality of said hollow fiber containing tubes being fabricated in a single layer of plastic having embedded therein a plurality of glass fibers substantially oriented in the longitudinal direction along said tube, said hollow fiber containing tubes contributing to the strength of said cable allowing said central strength member to have a reduced cross sectional area.

2. The optical fiber cable according to claim 1 wherein said plastic tube is an extruded polyethylene plastic tube.

3. The optical fiber cable according to claim 2 wherein said glass fibers are about 0.5 centimeter in length.

4. The optical fiber cable according to claim 1 wherein said fibers comprise between 25–30 percent of the material volume of said tubes.

5. The optical fiber cable according to claim 1 wherein said glass fibers are pushed into said plastic tube and are substantially absent from the surface of said tubes.

6. The optical fiber cable according to claim 1 wherein said strength member is fabricated from an epoxy impregnated glass.

7. The optical fiber cable according to claim 1 wherein said strength member is fabricated from a glass reinforced plastic.

8. The optical fiber cable according to claim 7 wherein said plastic is polyethylene.

9. A dielectric optical fiber cable comprising
(a) a longitudinal tubular cover member,
(b) a central strength member positioned centrally within the hollow of said cover member and fabricated from an insulator material,
(c) a plurality of plastic fiber accommodating longitudinal tubular members surrounding said central member, each positioned between said central member and said cover member, each of said tubular members containing at least one optical fiber within the hollow thereof and each of said tubular members being fabricated in a single layer of plastic having embedded therein a plurality of glass fibers oriented longitudinally along said tubular member, said plurality of glass fibers being of a substantially smaller length than any of said tubular members whereby each of said tubular members provides additional support to said cable enabling said central strength member to have a reduced cross sectional area.

10. The optical fiber cable according to claim 9 wherein said plastic is polyethylene.

11. The optical fiber cable according to claim 9 wherein said glass fibers are about 0.5 centimeters in length.

12. The optical fiber cable according to claim 9 wherein said plastic tubular members are extruded with said glass fibers.

13. The optical fiber cable according to claim 9 wherein said central strength member is an epoxy impregnated glass member.

14. The optical fiber cable according to claim 9 wherein said fibers comprise between 25-30 percent of the material volume of said tubular member.

15. The optical fiber cable according to claim 9 wherein said strength member is fabricated from a glass reinforced plastic.

16. The optical fiber cable according to claim 15 wherein said plastic is polyethylene.

17. The optical fiber cable according to claim 9 wherein said glass fibers are pushed into said tubular members and are substantially absent at the surface.

* * * * *